(12) United States Patent
Hart

(10) Patent No.: US 7,616,555 B2
(45) Date of Patent: Nov. 10, 2009

(54) MINIMUM VARIANCE LOCATION ESTIMATION IN WIRELESS NETWORKS

(75) Inventor: Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 11/542,721

(22) Filed: Oct. 3, 2006

(65) Prior Publication Data

US 2008/0080429 A1    Apr. 3, 2008

(51) Int. Cl.
*H04J 11/00* (2006.01)
(52) U.S. Cl. .............. 370/203; 370/342; 342/350; 342/450; 455/456.1; 455/456.3
(58) Field of Classification Search .......... 370/203, 370/332, 342; 342/350, 450; 455/456.1, 455/456.3, 426.1
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,327,144 A | 7/1994 | Stilp et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc | 455/456.2 |
| 5,666,662 A | 9/1997 | Shibuya | |
| 5,717,406 A | 2/1998 | Sanderford et al. | 342/457 |
| 5,732,354 A | 3/1998 | MacDonald | |
| 6,112,095 A | 8/2000 | Wax et al. | |
| 6,115,605 A | 9/2000 | Siccardo et al. | |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |
| 6,269,246 B1 | 7/2001 | Rao et al. | |
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,304,218 B1 | 10/2001 | Sugiura et al. | |
| 6,317,599 B1 | 11/2001 | Rappaport et al. | |
| 6,317,604 B1 | 11/2001 | Kovach et al. | |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,526,283 B1 | 2/2003 | Jang | |
| 6,556,942 B1 | 4/2003 | Smith | |
| 6,581,000 B2 | 6/2003 | Hills et al. | |
| 6,664,925 B1 | 12/2003 | Moore et al. | |
| 6,674,403 B2 | 1/2004 | Gray et al. | 342/463 |

(Continued)

*Primary Examiner*—Amy Haspel
(74) *Attorney, Agent, or Firm*—Baker Botts L.L.P.

(57) ABSTRACT

In one embodiment, a method includes receiving received signal strength data, computing an aggregate square error surface based on the received signal strength data, computing a probability surface by applying a probability density function to the aggregate error surface, and computing a mean location of a wireless node.

17 Claims, 6 Drawing Sheets

U.S. PATENT DOCUMENTS

| | | |
|---|---|---|
| 6,704,352 B1 | 3/2004 | Johnson |
| 6,728,782 B1 | 4/2004 | D'Souza et al. |
| 6,754,488 B1 | 6/2004 | Won et al. |
| 6,766,453 B1 | 7/2004 | Nessett et al. |
| 6,799,047 B1 | 9/2004 | Bahl et al. ............... 455/456.1 |
| 6,804,394 B1 | 10/2004 | Hsu |
| 6,850,946 B1 | 2/2005 | Rappaport et al. |
| 6,990,428 B1 | 1/2006 | Kaiser et al. ............... 702/150 |
| 7,312,752 B2 * | 12/2007 | Smith et al. ................. 342/464 |
| 2001/0022558 A1 * | 9/2001 | Karr et al. ................... 342/450 |
| 2002/0045424 A1 | 4/2002 | Lee ............................. 455/41 |
| 2002/0102988 A1 | 8/2002 | Myllymaki |
| 2002/0115445 A1 | 8/2002 | Myllymaki |
| 2002/0118118 A1 | 8/2002 | Myllymaki et al. |
| 2002/0154134 A1 | 10/2002 | Matsui |
| 2002/0168958 A1 | 11/2002 | Ford et al. |
| 2002/0174335 A1 | 11/2002 | Zhang et al. |
| 2002/0176366 A1 | 11/2002 | Ayyagari et al. |
| 2003/0031234 A1 * | 2/2003 | Smee et al. ................. 375/147 |
| 2003/0117985 A1 | 6/2003 | Fujii et al. |
| 2003/0130987 A1 | 7/2003 | Edlund et al. |
| 2003/0135486 A1 | 7/2003 | Edlund et al. |
| 2003/0135762 A1 | 7/2003 | Macaulay |
| 2004/0066757 A1 | 4/2004 | Molteni et al. ............... 370/329 |
| 2004/0072577 A1 | 4/2004 | Myllymaki et al. |
| 2004/0111397 A1 | 6/2004 | Chen et al. |
| 2004/0127228 A1 * | 7/2004 | You et al. ................ 455/456.1 |
| 2004/0151377 A1 | 8/2004 | Boose et al. |
| 2004/0166878 A1 | 8/2004 | Erskine et al. ........... 455/456.1 |
| 2004/0176108 A1 | 9/2004 | Misikangas |
| 2004/0180671 A1 * | 9/2004 | Spain, Jr. ................ 455/456.1 |
| 2004/0186847 A1 | 9/2004 | Rappaport et al. |
| 2004/0198373 A1 | 10/2004 | Ford et al. |
| 2004/0198392 A1 | 10/2004 | Harvey et al. ........... 455/456.1 |
| 2004/0203910 A1 | 10/2004 | Hind et al. ............... 455/456.1 |
| 2004/0219931 A1 * | 11/2004 | Bi et al. ................... 455/456.1 |
| 2004/0236547 A1 | 11/2004 | Rappaport et al. |
| 2004/0259554 A1 | 12/2004 | Rappaport et al. |
| 2004/0259555 A1 | 12/2004 | Rappaport et al. |
| 2005/0128139 A1 | 6/2005 | Misikangas et al. |
| 2005/0131635 A1 | 6/2005 | Myllymaki et al. |
| 2005/0136944 A1 | 6/2005 | Misikangas et al. |
| 2005/0185615 A1 | 8/2005 | Zegelin ..................... 370/331 |
| 2005/0208952 A1 * | 9/2005 | Dietrich et al. .......... 455/456.1 |
| 2005/0282540 A1 * | 12/2005 | Motamedi et al. ........... 455/423 |

* cited by examiner

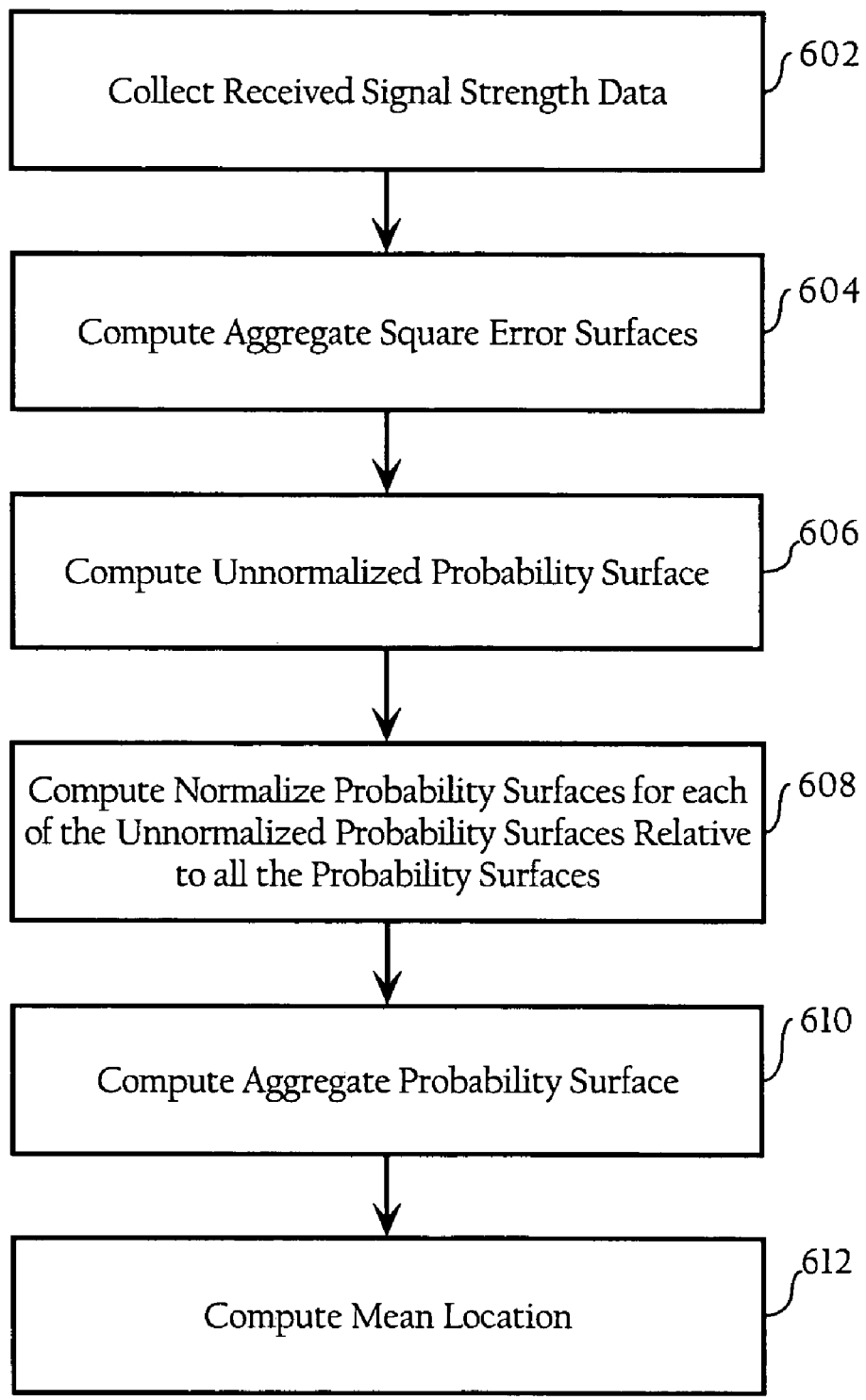
Fig._6

MINIMUM VARIANCE LOCATION ESTIMATION IN WIRELESS NETWORKS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. For some applications, it is desirable to determine the location of a given wireless node. Some wireless infrastructures may provide the media access control (MAC) address of a wireless access point or a basic service set identification (BSSID), as a coarse-grained proxy for the actual location of a given wireless node. A problem with such methods is that the estimated location is typically valid only during an initial association between the wireless access point and the wireless node before the wireless node moves to another location. Accordingly, this results in poor location accuracy.

DESCRIPTION OF THE DRAWINGS

FIG. 6 illustrates another example method associated with locating a wireless node.

DESCRIPTION OF EXAMPLE EMBODIMENTS

A. Overview

Particular embodiments of the present invention are directed to locating a wireless node based on received signal strength values. According to one embodiment of the present invention, a location system estimates the location of a given wireless node using a minimum variance estimation process. In one implementation of the invention, the location system accounts for variation in transmit power when estimating the location of a wireless node.

B. Example Wireless Network System Architecture

B.1. Network Topology

Figure 1:
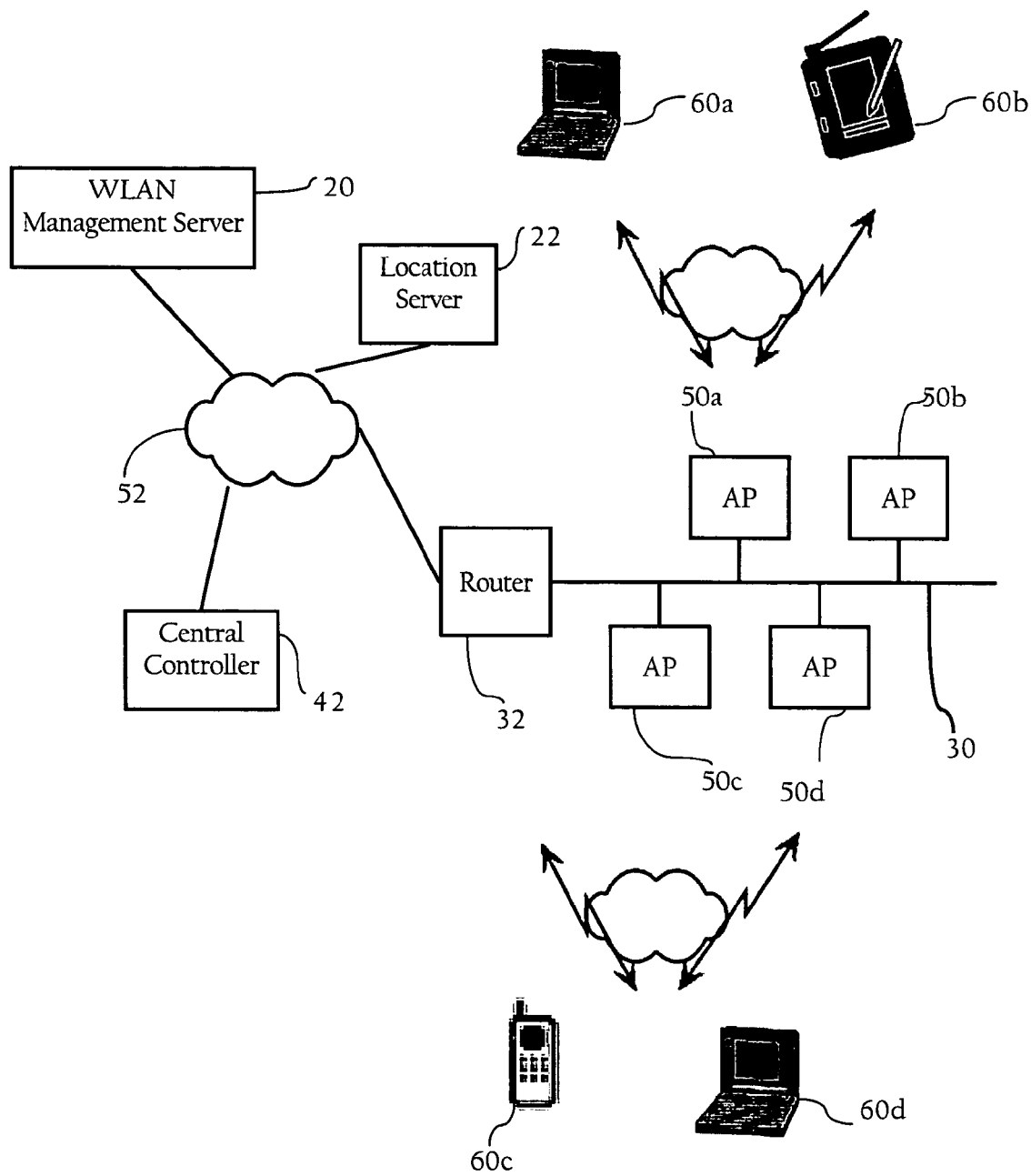
FIG. 1 illustrates an example wireless local area network (WLAN) system.

FIG. 1 illustrates an example wireless local area network (WLAN) system. In a specific embodiment of the present invention, the system includes a WLAN management server 20, a location server 22, a central controller 42, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless nodes via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless node devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless controller 42. In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless controllers and access points.

B.2. Location Server

Figure 2:
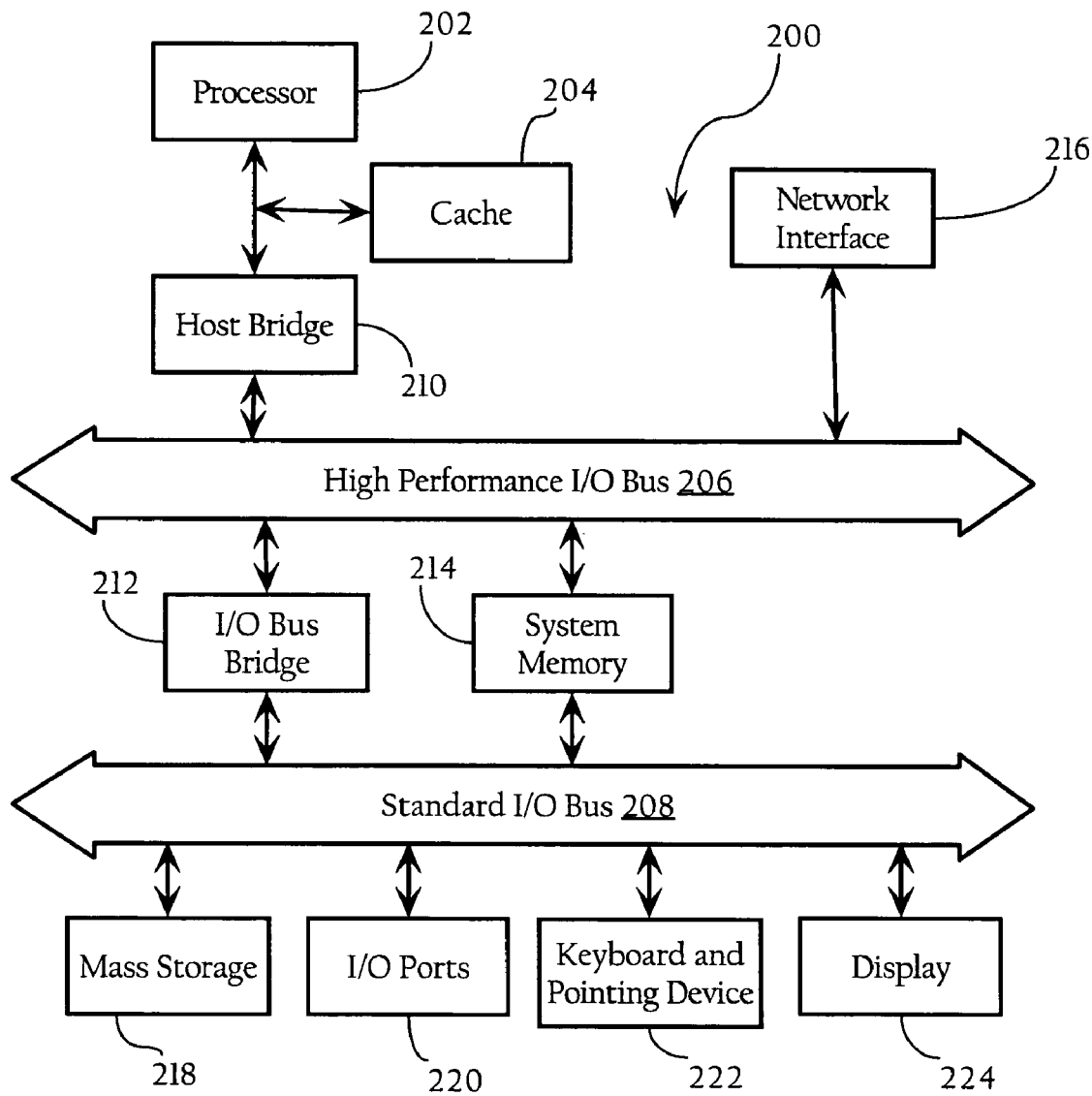
FIG. 2 illustrates an example a hardware system, which may be used to implement a location server.

FIG. 2 illustrates an example a hardware system, which may be used to implement a location server 22. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the location server 22 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

C. Minimum Variance Estimation as a Location Algorithm

According to one embodiment of the present invention, location server 22 estimates the location of a given wireless node using a minimum variance estimation as the location algorithm. As described in more detail below, the location system computes an aggregate square error surface based on received signal strength data associated with a given wireless node, computes a probability surface based on the aggregate error surface, and then computes a mean location of the wireless node based on the probability surface.

Figure 3:
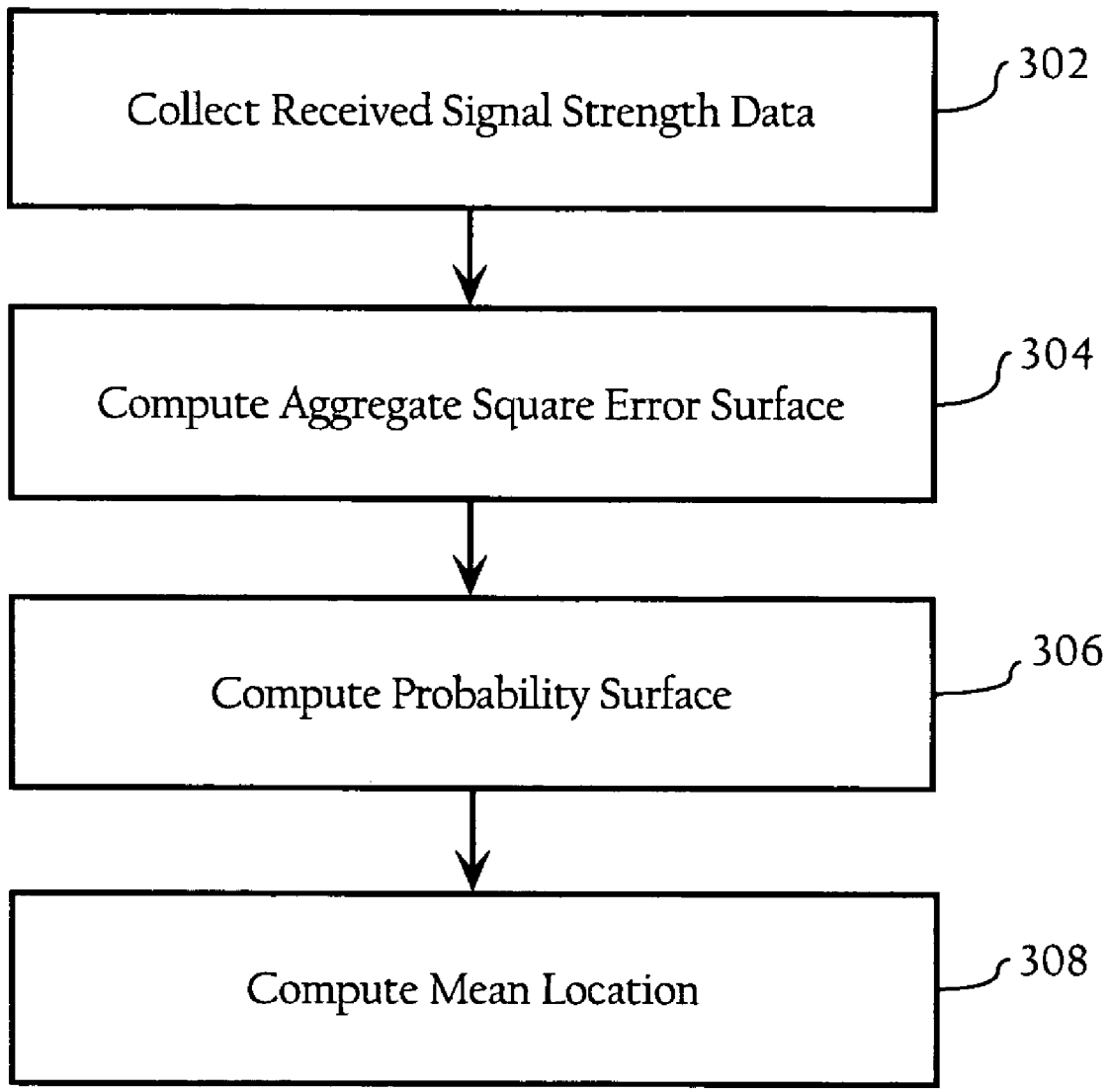
FIG. 3 illustrates an example method associated with locating a wireless node.

FIG. 3 illustrates an example method associated with locating a wireless node. As FIG. 3 shows, the location system collects received signal strength data (302). In one implementation, collection of received signal strength data is described in following sections.

Next, the location system computes an aggregate square error surface based on the received signal strength data (304), as discussed in more detail in following sections. The aggregate error surface characterizes the aggregate square error or difference between the received signal strength, $SS_i$, detected by the infrastructure radio transceivers and the expected received signal strength values in the coverage maps corresponding to the infrastructure radio transceivers.

Next, the location system computes a probability surface by computing a probability density function (Pu) from the aggregate error surface (306). In one implementation, the unnormalized probability density function (Pu) may be described using the following equation:

$$Pu(x, y) = \exp\left(-\frac{1}{2\sigma^2} S(x, y)\right),$$

where e is Euler's number, σ is the standard deviation of the residual errors (e.g., measured pathloss less the estimated pathloss based on calibration values or a default value (e.g., by default σ equals 7)), and S(x,y) represents the value of an error surface at a given location bin (x,y). In one implementation, the location system computes the probability function for each location bin in the aggregate error surface. The Pu represents the unnormalized probability density that the wireless node is at a given location. Accordingly, lower aggregate square error values for a given location bin result in higher probability values.

In one embodiment, the location system normalizes the probability surface such that the sum of the probabilities over the entire surface equals one. The normalized probability surface may be described using the following equation:

$$P(x,y) = Pu(x,y)/\Sigma Pu(x,y)$$

Next, the location system computes a mean location of the wireless node for the x- and y-coordinates as the estimated location (308). In one implementation, the mean of x is the sum for all x-coordinates of the coordinate value of x multiplied by the sum of all normalized probability values [P(x,y)] across all y-coordinate values. Mean of x, in one implementation, may be described using the following equation:

$$\text{mean\_x} = \sum_x \left(x \times \sum_y P(x, y)\right)$$

Similarly, in one implementation, the mean of y may be described using the following equation:

$$\text{mean\_y} = \sum_y \left(y \times \sum_x P(x, y)\right)$$

The minimum variance location estimation algorithm described above reduces the prevalence of large location errors. For example, given one 70 dBm reading from an omnidirectional wireless access point, the location system may estimate that the wireless node is at a certain radius R from a given wireless access point. However, without the minimum variance location estimation algorithm, the location system would not know whether the wireless node is north, south, east or west of the wireless access point. It arbitrarily chooses one direction, e.g., due north, so the error is as large as 2R whenever the true location is due south. Accordingly, a minimum variance location estimation algorithm is a more reliable (minimum variance) solution, because the minimum variance location estimation algorithm enables the location system to estimate the location of the wireless node directly at the wireless access point (with an error R). For example, in one implementation, with the minimum variance location estimation algorithm, for two omni-directional wireless access points, one north of the other, the location system using the minimum variance location estimation algorithm would estimate the wireless node to lie along the north-south line between the wireless access points, since the wireless node is equally likely to be east or west of the two wireless access points.

C.1. Infrastructure Radio Transceivers and Received Signal Strength

Figure 4:
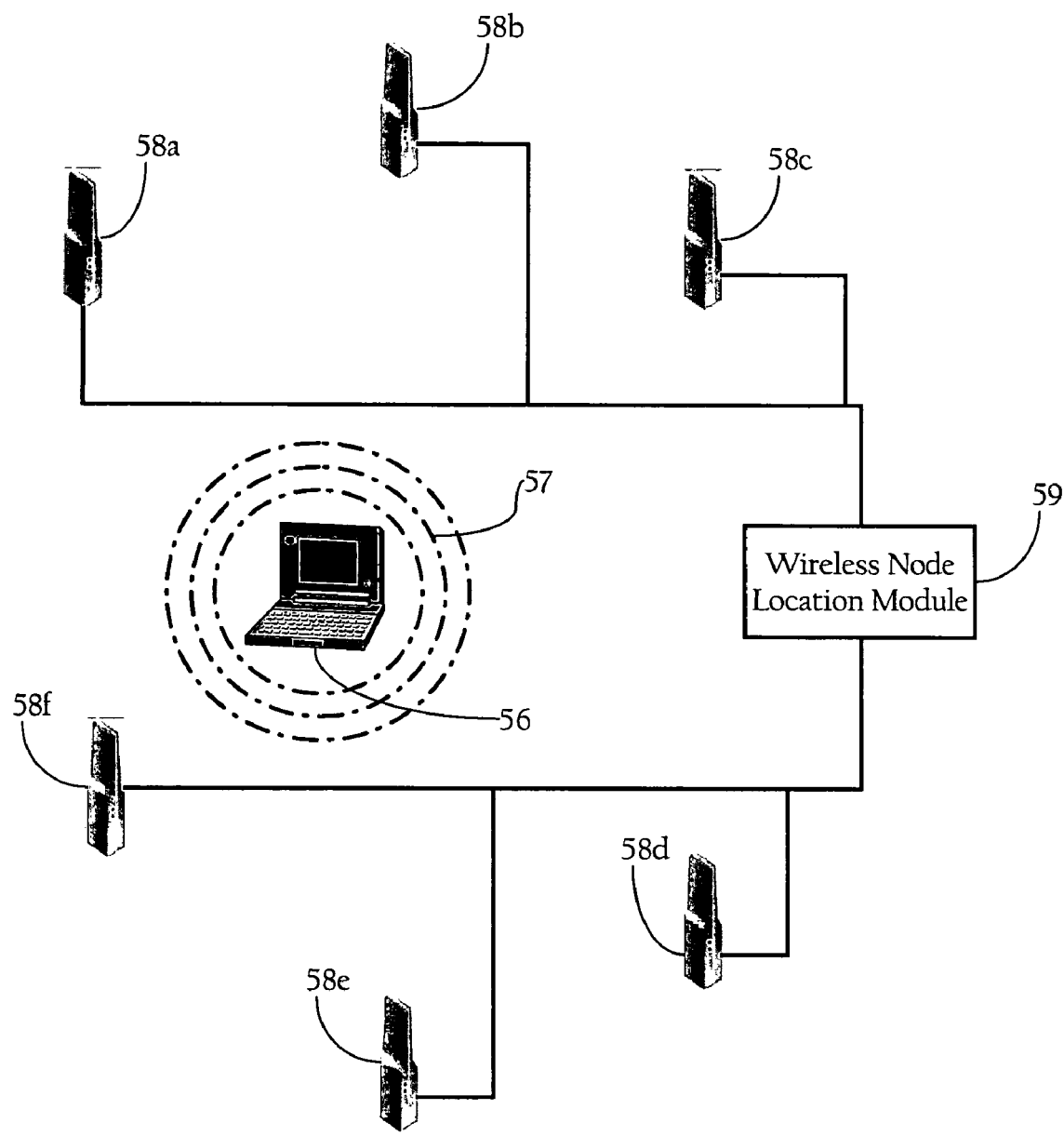
FIG. 4 illustrates an example wireless node location mechanism.

FIG. 4 illustrates a plurality of infrastructure radio transceivers in an example wireless node location mechanism. As FIG. 4 shows, the wireless node location mechanism includes a wireless node location module 59 and a plurality of infrastructure radio transceivers 58a, 58b, 58c, 58d, 58e, and 58f disposed throughout a physical space. One skilled in the art will recognize that the system depicted in FIG. 1 represents an example of the basic components of the invention and is mostly for didactic purposes. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems. For example, wireless node location module 59 can be a software application implemented by location server 22. In addition, infrastructure radio transceivers 58 can be wireless access points of a wireless LAN.

Infrastructure radio transceivers 58 are operative to detect the strength of received radio-frequency signals, such as the signals 57 transmitted by wireless node 56 and by other radio transceivers, and provide the detected signal strength data for corresponding wireless nodes to wireless node location module 59. In one implementation, infrastructure radio transceivers 58 are also operative to transmit and receive wireless or radio-frequency signals according to a wireless communications protocol, such as the IEEE 802.11 WLAN protocol. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in the 802.11a-5 GHz band, and/or the 802.11b/g-2.4 GHz band. In one implementation, infrastructure radio transceivers 58 can be configured to collect the signal strength information associated with wireless nodes and transmit the collected data in response to SNMP or other requests by wireless node location module 59. In other implementations, the infrastructure radio transceivers 58 can transmit signal strength information on a regular or periodic basis. Other methods for collecting signal strength data may also be employed.

Identification of wireless nodes depends on the wireless communications protocol in use. For 802.11 WLAN environments, for example, wireless nodes can be identified based on MAC address. Furthermore, wireless nodes can be authorized mobile stations, such as remote client elements 60c, 60d (see FIG. 1), rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device. The wireless node may also be an RFID tag, or any other RF signal source.

In one implementation, infrastructure radio transceivers 58 are also operable to communicate with one or more mobile stations, such as wireless node 56, according to a wireless communication protocol. For example, radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, radio transceiver 58 may also be an access element or light weight access point in a wireless network featuring hierarchical processing of protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

In one implementation, infrastructure radio transceivers 58 make use of the signal strength detection functionality residing on a wireless network interface adapter to detect signal strength on a frame-by-frame basis. For example, the IEEE 802.11 standard defines a mechanism by which RF energy is measured by the circuitry (e.g., chip set) on a wireless network interface controller. The IEEE 802.11 protocol specifies an optional parameter, the receive signal strength indicator (RSSI). This parameter is a measure by the PHY layer of the energy observed at the antenna used to receive the current packet or frame. This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from wireless node 56. The resulting signal strength information, in one implementation, can be associated with a time stamp corresponding to the receipt of the frame. As discussed herein, this signal strength information can be collected at each infrastructure radio transceiver 58 and/or the wireless node location module 59 in suitable data structures.

Wireless node location module 59, in one implementation, collects signal strength data received from infrastructure radio transceivers 58 and maintains the signal strength data in association with a wireless node identifier, and an identifier for the particular infrastructure radio transceiver 58 which provided the signal strength data. Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. Wireless node location module 59, in one implementation, maintains signal strength data for all other wireless nodes in tables or other suitable data structures. In one implementation, wireless node location module 59 maintains, for each antenna of each radio transceiver 58, a separate table including at least two fields: 1) a wireless node identifier; 2) the detected signal strength. Additional fields may also include a time stamp indicating the time the infrastructure radio transceiver 58 received the signal. In one implementation, when the memory space allocated to the wireless node tables is depleted, the least recently used/updated entry as indicated by the time stamps is overwritten. In the case that all entries are recent, the weakest RSSI may be overwritten instead. In one implementation, wireless node location module 59 filters the signal strength data received from the infrastructure radio transceivers 58 against a list of wireless node identifiers in-order to identify the appropriate data structure to update. One skilled in the art will recognize that a variety of data structures beyond matrices and tables can be used. One skilled in the art will recognize that signal strength data for a wireless node can be collected in a variety of manners.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average, weighted moving average, or time-weighted moving average can be used if successive wireless frames corresponding to a given wireless node are encountered within a threshold time interval (e.g., typically resulting from a data stream transmission). In such a situation, the time stamp can correspond to the time of the last packet or frame. In addition, while radio transceivers 58 when operating as access points typically operate on different channels, mobile stations at various times (e.g., transmitting probe requests to find access points) transmit wireless frames on all available operating channels. This helps to ensure that a plurality of infrastructure radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station.

C.2. Aggregate Error Surface

Wireless node location module 59 also maintains a RF physical model of the coverage area associated with the RF environment. In one implementation, the RF physical model includes a plurality of coverage maps. Each coverage map characterizes for a given infrastructure radio transceiver and antenna 58 the expected received signal strength associated with a wireless transmitter at a given location. For example, in one implementation, the RF physical model comprises, for each antenna, a radio coverage map or matrix that indicates the expected signal strength detected at an infrastructure radio transceiver received from a wireless node, assuming a uniform transmit power, at a given location defined in x-, and y-coordinates. This database can be populated in a variety of ways. For example, the radio coverage maps can be populated with the results of an extensive site survey, according to which a wireless transmitter is placed at different locations in the physical space. During the site survey, the infrastructure radio transceivers 58 operate in a listening mode that cycles between the antennas and reports the resulting signal strength of the signal transmitted by the wireless node used to conduct the site survey. In one implementation, the infrastructure radio transceivers 58 can be configured to transmit the signal strength data back to the wireless transmitter, which may be a laptop computer or other wireless device. The coverage maps are constructed by associating the signal strength and location data in the coverage maps corresponding to each infrastructure radio transceiver. The coverage maps may also be constructed by having a WLAN tester (or other wireless node) simply measure the signal strength of frames transmitted by the infrastructure radio transceivers 58 (e.g., beacon packets) at desired locations within the deployment region. If path loss symmetry is assumed, these values can be used to construct the coverage maps for each of the infrastructure radio transceivers. Still further, locations in the coverage map not populated by manual methods can be estimated based on interpolation or extrapolation techniques.

In one implementation, a coverage map, for each infrastructure radio transceiver 58, is maintained that includes the signal strengths in an N×M matrix of location bins, where N is the number of x-coordinates in the coverage map, and M is the number of y-coordinates in the coverage map. In another implementation, the coverage map is a three dimensional N×M×P matrix of location bins, where P is the number of z-coordinates in the coverage map. In one implementation, the extent of the physical space model by the coverage maps for each infrastructure radio transceiver 58 are co-extensive. The coverage maps for all infrastructure radio transceivers 58 can be co-extensive with the physical space in which the location system is deployed, or with a boundary configured by a network administrator. In one implementation, however, knowledge of various antenna attributes associated with each infrastructure radio transceiver 58—such as antenna type (e.g., omni-directional, directional), peak gain orientation, beamwidth, front-to-back isolation—can be used to compress or reduce the size of the coverage maps. In one implementation, the coverage maps can be configured to be substantially coextensive with the antenna pattern of each antenna connected to the infrastructure radio transceivers 58 out to a threshold signal strength or gain level. For example, the coverage map for a given antenna can be compressed to the front or intended coverage area of the directional antenna. In addition, if the coverage maps are compressed, the search for the best fit across selected coverage maps can be isolated to the overlap between coverage maps associated with the antennas selected to locate the wireless node.

In another implementation, the coverage maps of the RF physical model may be constructed using RF prediction to model the coverage area, employing mathematical techniques like ray-tracing, and the like. In one implementation, the RF prediction model can be computed for each coordinate location in a desired physical space, assuming a uniform wireless node transmit power. The estimated signal strength information for each infrastructure radio transceiver 58 can be used to populate the coverage maps discussed above. In an alternative embodiment, RF prediction models can be computed relative to each infrastructure radio transceiver antenna. If path loss symmetry and transmit power symmetry between the wireless nodes and the infrastructure radio transceivers 58 are assumed, the coverage maps for each infrastructure radio transceiver antenna can be populated by using the computed values at each of the coordinate locations in the coverage map. Of course, site survey data can also be used to adjust one or more parameters associated with the RF prediction model used to estimate expected signal strength at the various locations. As above, the boundaries of the coverage maps can be contoured based on the properties of the antennas connected to the infrastructure radio transceivers 58. In addition, the location coordinates in the coverage maps can be two-dimensional, x- and y-coordinates, defining location in a horizontal plane, or three dimensional, x-, y- and z-coordinates, defining location in three dimensions. In addition, the values of the coordinates can be either global (i.e., longitude and latitude) or expressed relative to an arbitrarily-defined origin. In addition, the granularity of the coordinates in the coverage maps depends on the desired granularity of the wireless node location estimates.

Figure 5:
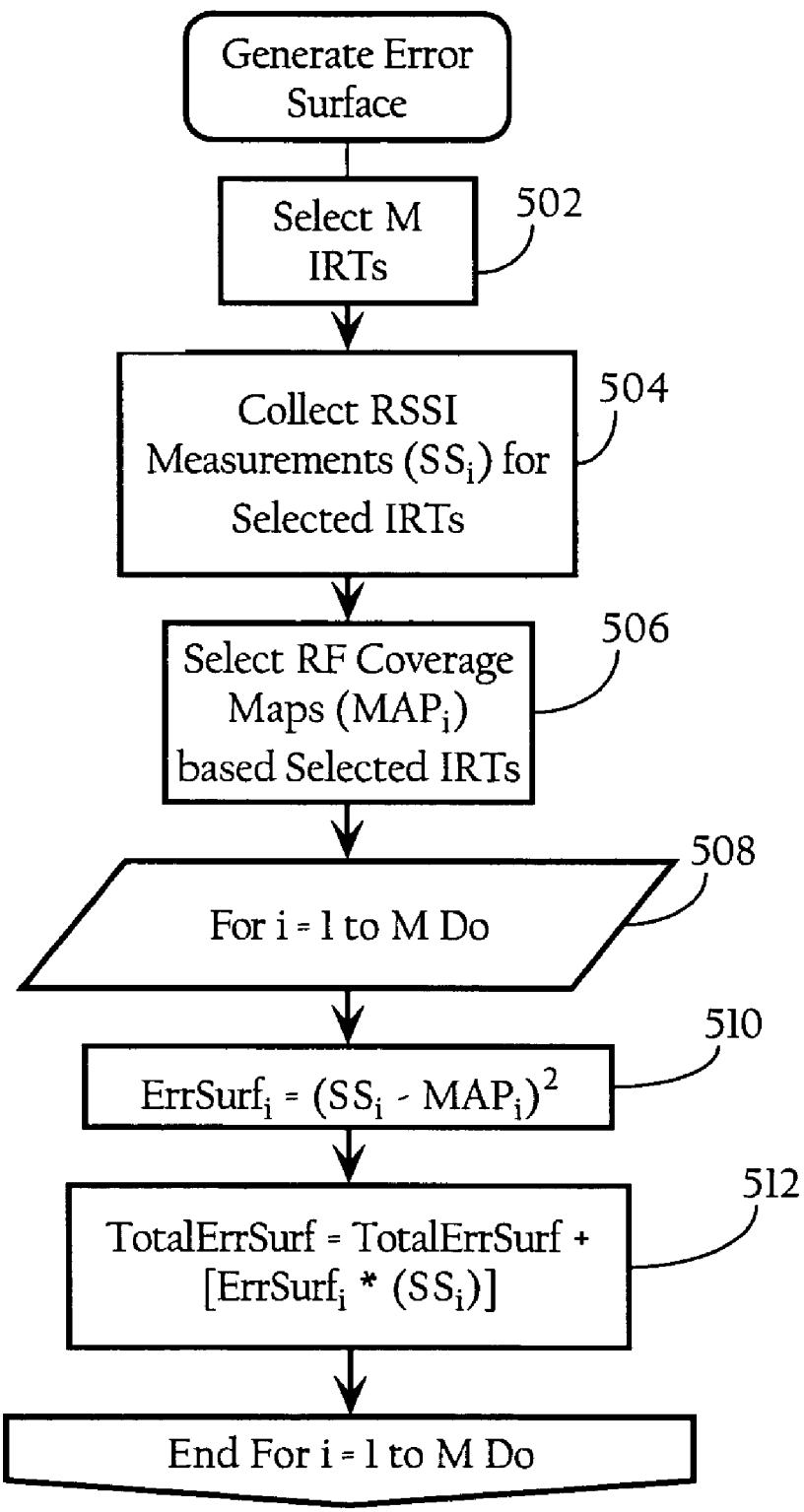
FIG. 5 illustrates an example method associated with generating an aggregate error surface.

FIG. 5 illustrates an example method associated with generating an aggregate error surface. The wireless node location functionality can be triggered on demand, for example, in response to a command issued by a network administrator using a control interface to locate a mobile station identified by a MAC address or other suitable identifier, such as an arbitrary name associated with a MAC address in a table or other data structure. Wireless node location module 59 may also be triggered automatically in response to the detection of a rogue access point. Wireless node location module 59 can also be configured to periodically determine the location of a given mobile station in order to track its movement over a period of time.

As FIG. 5 illustrates, wireless node location module 59, in one implementation, begins by selecting the infrastructure radio transceivers (IRTs) 58 whose signal measurements will be used in locating the desired wireless node (502). In one implementation, wireless node location module 59 scans the data structures discussed above to identify the infrastructure radio transceivers 58 that see or detect wireless frames transmitted by the desired wireless node. In implementations where signal strength data is regularly collected (as opposed to on demand), the time stamps in the data structures can be used to filter out infrastructure radio transceivers 58 that have not detected the desired wireless node within a threshold period of time. Additional or alternative filter criteria can include a threshold signal strength level (such as −80 dBm). In the implementation shown, wireless node location module 59 selects the M infrastructure radio transceivers 58 that report the strongest signal strengths (where M is a configurable parameter). In one implementation, if an insufficient number of infrastructure radio transceivers 58 are identified, wireless node location module 59 can command the infrastructure radio transceivers 58 to actively scan for the desired wireless node and return signal strength information. Wireless node location module 59 collects the signal strength (e.g., RSSI) measurements corresponding to the selected infrastructure radio transceivers 58 (504), and identifies the RF coverage maps to be used in estimating the location of the wireless node based on selected infrastructure radio transceivers 58 (506).

As FIG. 5 shows, wireless node location module 59, for all selected infrastructure radio transceivers (508), computes, for each point in the coverage map, $MAP_i$, an error surface, $ErrSurf_i$, characterizing the difference between the signal strength, $SS_i$, detected by the infrastructure radio transceiver and the value in the corresponding coverage map (510). To neutralize positive and negative errors, wireless node location module 59, in one implementation, uses the square of the error for each point in the error surface. As FIG. 5 illustrates, wireless node location module 59 sums the individual error surfaces, $ErrSurf_i$, to create a total error surface, TotalErrSurf, for all points for which the error surfaces overlap (512). This aggregate error surface can then be used in the minimum variance process described above to compute the estimated location of the wireless node.

D. Treating Wireless Node Transmission Power as a Nuisance Parameter

According to another embodiment of the present invention, the location system accounts for variation in wireless node transmit power when computing location estimates. Many prior art location algorithms assume a nominal transmit power for a given wireless node. In practice, however, wireless node transmit power may vary considerably, affecting the accuracy of location determinations. As described in more detail below, the location system computes aggregate square error surfaces at various transmit powers based on received signal strength data.

D.2. Wireless Node Location Determination

FIG. 6 illustrates another example method associated with locating a wireless node. As FIG. 6 shows, the location system collects received signal strength data for a wireless node (602). Next, the location system computes aggregate square error surfaces (see above), wherein one of the aggregate square error surfaces corresponds to a nominal transmit power, and computes remaining aggregate square error surfaces, each corresponding to at least one transmission power above and/or below the nominal transmit power (e.g., +/−1 dB, +/−2 dB, +/−3 db, +/−4 db, etc.) based on the received signal strength data (604). Asymmetric transmit power variations may also be assumed, such as −7, −6, −5, −4, −3, −2, −1, 0, +1, +2 dB, since the maximum transmit power is normally regulated yet the minimum transmit power is not. Different granularities in the transmit power variations may also be useful to reduce the computational complexity of allowing different transmit powers: for instance +/−4, +/−2 and 0 dB only. Next, the wireless infrastructure computes an unnormalized probability surface from each of the aggregate square error surfaces, as discussed above (606). Next, the wireless infrastructure computes normalized probability surfaces for each of the unnormalized probability surfaces relative to all the probability surfaces (608). That is, the normalized probability values for each location bin are based on the probability values across all probability surfaces. Next, the wireless infrastructure computes an aggregate probability surface across the normalized probability surfaces at each location bin (610), and computes the mean x- and y-locations, as discussed above, to yield an estimated location of the wireless-node (612).

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A data storage medium encoded with computer executable instructions for acquiring information from a wireless network, the computer executable instructions when executed operable to cause a processor to:
    collect received signal strength data;
    compute an aggregate square error surface based on the received signal strength data, wherein the aggregate square error surface corresponds to a matrix of locations each defined by an x-coordinate and a y-coordinate;

compute a probability surface by computing a probability density function from the aggregate error surface, wherein the probability values of the probability surface are normalized such that a sum of the probability values over an entire surface equals one; and compute a mean x-coordinate location and a mean y-coordinate location of a wireless node based on the probability surface, wherein the mean x-coordinate location is a sum, for all x-coordinates of the matrix, of the coordinate value of x multiplied by the sum of all normalized probability values across all y-coordinate values of the matrix, and, wherein the mean y-coordinate location is a sum, for all y-coordinates of the matrix, of the coordinate value of x multiplied by the sum of all normalized probability values across all x-coordinate values of the matrix.

2. The data storage medium of claim 1 wherein the aggregate error surface characterizes a difference between the received signal strength values and expected received signal strength values.

3. The data storage medium of claim 1 wherein the probability surface is computed based on the following expression:

$$Pu(x, y) = \exp\left(-\frac{1}{2\sigma^2} S(x, y)\right),$$

wherein exp is Euler's number, σ is a standard deviation of residual errors, and S represents a value of an error surface at a given location bin (x,y).

4. The data storage medium of claim 1 wherein the normalized probability surface is computed based on the following expression:

$P(x,y) = Pu(x,y)/\Sigma Pu(x,y).$

5. A method for estimating a location of a wireless node, comprising:

collecting, by a computing device, received signal strength data;

computing an aggregate square error surface based on the received signal strength data, wherein the aggregate square error surface corresponds to a matrix of locations each defined by an x-coordinate and a y-coordinate;

computing a probability surface by computing a probability density function from the aggregate error surface, wherein the probability values of the probability surface are normalized such that a sum of the probability values over an entire surface equals one; and computing a mean x-coordinate location and a mean y-coordinate location of a wireless node based on the probability surface, wherein the mean x-coordinate location is a sum, for all x-coordinates of the matrix, of the coordinate value of x multiplied by the sum of all normalized probability values across all y-coordinate values of the matrix, and, wherein the mean y-coordinate location is a sum, for all y-coordinates of the matrix, of the coordinate value of x multiplied by the sum of all normalized probability values across all x-coordinate values of the matrix.

6. The method of claim 5 wherein the aggregate error surface characterizes a difference between the received signal strength values and expected received signal strength values.

7. The method of claim 5 wherein the probability surface is computed based on the following expression:

$$Pu(x, y) = \exp\left(-\frac{1}{2\sigma^2} S(x, y)\right),$$

wherein exp is Euler's number, σ is a standard deviation of residual errors, and S represents a value of an error surface at a given location bin (x,y).

8. The method of claim 5 wherein the normalized probability surface is computed based on the following expression:

$P(x,y) = Pu(x,y)/\Sigma Pu(x,y).$

9. A system comprising:
one or more infrastructure radio transceivers; and
a wireless network infrastructure node operable to:
collect received signal strength data sensed by the one or more infrastructure radio transceivers; compute an aggregate square error surface based on the received signal strength data, wherein the aggregate square error surface corresponds to a matrix of locations each defined by an x-coordinate and a y-coordinate;

compute a probability surface by computing a probability density function from the aggregate error surface, wherein the probability values of the probability surface are normalized such that a sum of the probability values over an entire surface equals one; and compute a mean x-coordinate location and a mean y-coordinate location of a wireless node based on the probability surface, wherein the mean x-coordinate location is a sum, for all x-coordinates of the matrix, of the coordinate value of x multiplied by the sum of all normalized probability values across all y-coordinate values of the matrix, and, wherein the mean y-coordinate location is a sum, for all y-coordinates of the matrix, of the coordinate value of x multiplied by the sum of all normalized probability values across all x-coordinate values of the matrix.

10. The system of claim 9 wherein the aggregate error surface characterizes a difference between the received signal strength values and expected received signal strength values.

11. The system of claim 9 wherein the probability surface is computed based on the following expression:

$$Pu(x, y) = \exp\left(-\frac{1}{2\sigma^2} S(x, y)\right),$$

wherein exp is Euler's number, σ is a standard deviation of residual errors, and S represents a value of an error surface at a given location bin (x,y).

12. The system of claim 9 wherein the normalized probability surface is computed based on the following expression:

$P(x,y) = Pu(x,y)/\Sigma Pu(x,y).$

13. A data storage medium encoded with computer executable instructions for acquiring information from a wireless network, the computer executable instructions when executed operable to cause a processor to:

collect received signal strength data for a wireless node;
compute a plurality of aggregate square error surfaces, wherein each of the aggregate square error surfaces corresponds to a matrix of locations each defined by an x-coordinate and a y-coordinate, and wherein one of the plurality of aggregate square error surfaces corresponds to a nominal transmission power, and remaining aggregate square error surfaces each correspond to at least one transmission power above or below the nominal transmission power;

compute an unnormalized probability surface for each of the aggregate square error surfaces;

compute normalized probability surfaces for each of the unnormalized probability surfaces relative to all the probability surfaces, wherein the probability values of the normalized probability surfaces are normalized such that a sum of the probability values over an entire surface equals one;

compute an aggregate probability surface across the normalized probability surfaces at each location bin; and compute a mean x-coordinate location and a mean y-coordinate location to yield an estimated location of the wireless node based on the aggregate probability surface, wherein the mean x-coordinate location is a sum, for all x-coordinates of the matrix, of the coordinate value of x multiplied by the sum of all normalized probability values across all y-coordinate values of the matrix, and , wherein the mean y-coordinate location is a sum, for all y-coordinates of the matrix, of the coordinate value of x multiplied by the sum of all normalized probability values across all x-coordinate values of the matrix.

14. The data storage medium of claim 13 wherein the plurality of aggregate square error surfaces are each composed of one or more error surfaces that characterize differences between the received signal strength values and expected received signal strength values at one or more locations.

15. The data storage medium of claim 13 wherein the probability surface is computed based on the following expression:

$$Pu(x, y) = \exp\left(-\frac{1}{2o^2}S(x, y)\right),$$

wherein exp is Euler's number, σ is a standard deviation of residual errors, and S represents a value of an error surface at a given location bin (x,y).

16. A method comprising:

collecting received signal strength data for a wireless node;

computing a plurality of aggregate square error surfaces, wherein each of the aggregate square error surfaces corresponds to a matrix of locations each defined by an x-coordinate and a y-coordinate, and wherein one of the plurality of aggregate square error surfaces corresponds to a nominal transmission power, and remaining aggregate square error surfaces each correspond to at least one transmission power above or below the nominal transmission power;

computing an unnormalized probability surface for each of the aggregate square error surfaces;

computing normalized probability surfaces for each of the unnormalized probability surfaces relative to all the probability surfaces, wherein the probability values of the normalized probability surfaces are normalized such that a sum of the probability values over an entire surface equals one;

computing an aggregate probability surface across the normalized probability surfaces at each location bin; and computing a mean x-coordinate location and a mean y-coordinate location to yield an estimated location of the wireless node based on the aggregate probability surface, wherein the mean x-coordinate location is a sum, for all x-coordinates of the matrix, of the coordinate value of x multiplied by the sum of all normalized probability values across all y-coordinate values of the matrix, and , wherein the mean y-coordinate location is a sum, for all y-coordinates of the matrix, of the coordinate value of x multiplied by the sum of all normalized probability values across all x-coordinate values of the matrix.

17. The method of claim 16 wherein the plurality of aggregate square error surfaces are each composed of one or more error surfaces that characterize differences between the received signal strength values and expected received signal strength values at one or more locations.

* * * * *

UNITED STATES PATENT AND TRADEMARK OFFICE
CERTIFICATE OF CORRECTION

| | | |
|---|---|---|
| PATENT NO. | : 7,616,555 B2 | Page 1 of 1 |
| APPLICATION NO. | : 11/542721 | |
| DATED | : November 10, 2009 | |
| INVENTOR(S) | : Brian Donald Hart | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this

Nineteenth Day of October, 2010

David J. Kappos
*Director of the United States Patent and Trademark Office*